United States Patent Office 3,545,254
Patented Dec. 8, 1970

3,545,254
CLOUD POINT DETECTOR
Pierre C. Chassagne and Emmanuel E. Neel, Sotteville, les Rouen, France, assignors to Shell Oil Company, New York, N.Y., a corporation of Delaware
Filed Feb. 13, 1968, Ser. No. 705,157
Int. Cl. G01n 25/02
U.S. Cl. 73—17                                    2 Claims

ABSTRACT OF THE DISCLOSURE

The detector operates by directing polarized light through a sample liquid. The light emerging from the sample liquid is directed onto a polarizing filter oriented to pass only unpolarized light. Unpolarized light is caused by the appearance of anisotropic crystals in the liquid and is detected by a photocell behind the polarizing filter. The improvement consists of a new means for cooling the sample liquid consisting of heat conducting collars thermally contacting the sample liquid on either side of the point at which the polarized light is directed therethrough.

CROSS-REFERENCE TO RELATED APPLICATIONS

The present invention is an improvement on an apparatus described in copending U.S. patent application Ser. No. 574,683, Automatic Cloud Point Detector, by Pierre C. Chassagne and Emmanuel E. Neel, filed Aug. 24, 1966, now Pat. No. 3,457,772 and assigned to the assignee of the present invention.

BACKGROUND OF THE INVENTION

The present invention relates to an improved apparatus for the determination of the cloud point of liquids and, more particularly, the cloud point of gas oils, such as kerosenes, diesel oils and fuel oils.

The cloud point of a gas oil is an important characteristic in defining certain hydrocarbon products and the measurement thereof makes it possible to control processing units in such a way that this product is obtained in a maximum yield with due regard to the relevant specifications.

In the laboratory, this measurement is normally carried out according to ASTM-method D97–57. It has also been proposed to measure this characteristic continuously, either by optical methods or by thermal methods.

Optical measurement lends itself admirably to observation of the appearance of clouding but is subject to certain interferences, especially by water. In fact, if a gas oil contains traces of water, for example about 80 p.p.m., this water becomes insoluble on cooling and the gas oil is rendered extremely cloudy. On the other hand, gas oils leaving a distillation column are usually cloudy because steam is injected into the columns. In these circumstances it becomes impossible to measure the cloud point of a water-containing product. It is necessary, therefore, to have the apparatus preceded by a purifying device which may comprise filters, coalescers, dryers, etc., and which, although eliminating the water, necessarily introduces a relatively important time constant, thus rendering the utilization of the control apparatus very difficult, if not impossible.

The copending patent identified above described a method and apparatus for determining the cloud point applicable to liquids, the cloud point of which is due to the appearance of crystals having an anisotropic structure. This method comprises illuminating the suitably cooled liquid by means of polarized light in such a way that in the absence of crystals the light is extinguished and determining the increase in light traversing the liquid, which increase is due to the depolarization of the incident light by the appearance of anisotropic crystals.

The present addition relates to improvements to the apparatus in question, more particularly to improving the cloud point values as determined by the said apparatus as compared with the values furnished by ASTM-method D97–57.

The apparatus described in the copending patent comprises a cell designed to receive the liquid to be examined, providing with at least two transparent windows and equipped with cooling means, a light source and a polarizing filter both arranged on one side of the cell in such a way that the incident light traverses the two windows, a second polarizing filter crossed with respect to the first and a photo-electric cell positioned in such a way as to determine the intensity of the residual light transmitted by the second filter.

SUMMARY OF THE INVENTION

A first improvement according to the present invention relates to the design of the cell provided with cooling means. Here, use is made of a block of heat-conductive material, preferably an aluminum alloy, pierced on the one hand by a central bore which receives a glass tube designed to contain the liquid to be examined and on the other hand by a second bore normal to the first for the passage of light beams. The cooling means, preferably thermo-elements functioning according to the Peltier effect, permit the block to be brought to a predetermined temperature. Applicants have established that the correlation of the cloud point valves obtained with an apparatus of this type with the valves of the ASTM-method D97–57 depends on a relationship between the heat exchange surfaces between the block and the tube and the diameter of the tube. In other words, it has been discovered that the rate at which heat is removed from the liquid is a key parameter in correlating the cloud point valves of this method with that of the ASTM-method D97–57. However, contrary to all expectations, the best correlation is not found with the maximum exchange surface. It was, in fact, found that for the preferred embodiment the best correlation is obtained with exchange surfaces of approximately half the maximum exchange surface. In addition, the greater part of this exchange surface is preferably concentrated near the transverse bore forming the light passage and at a point on the upstream side with respect to the sense of introduction of the liquid into the tube. That is, the tube is maintained in the central bore of the block by means of two collars made of heat-conductive material which are arranged above and below the transverse bore forming the light passage. The contact surface of these collars with the tube is approximately half the total surface of the central bore, with one of the collars being wider than the other.

According to another feature of the present invention, the determination of the cloud point with the aid of an apparatus as described above is carried out by means of a continuous method. To this end the liquid is introduced into the tube, while the block is brought to a low constant temperature. When the cloud point appears, corresponding to a depolarization of the light, the photo-electric cell receives light and transmits a signal to a trigger, which by means of a time delay relay operates a valve so that the tube is purged and a fresh sample introduced for another measurement to take place.

BRIEF DESCRIPTION OF THE DRAWING

The invention may be carried out in various ways, but one specific embodiment will now be described by way of example with reference to the accompanying drawing, in which.

Figures 1, 2, 3:
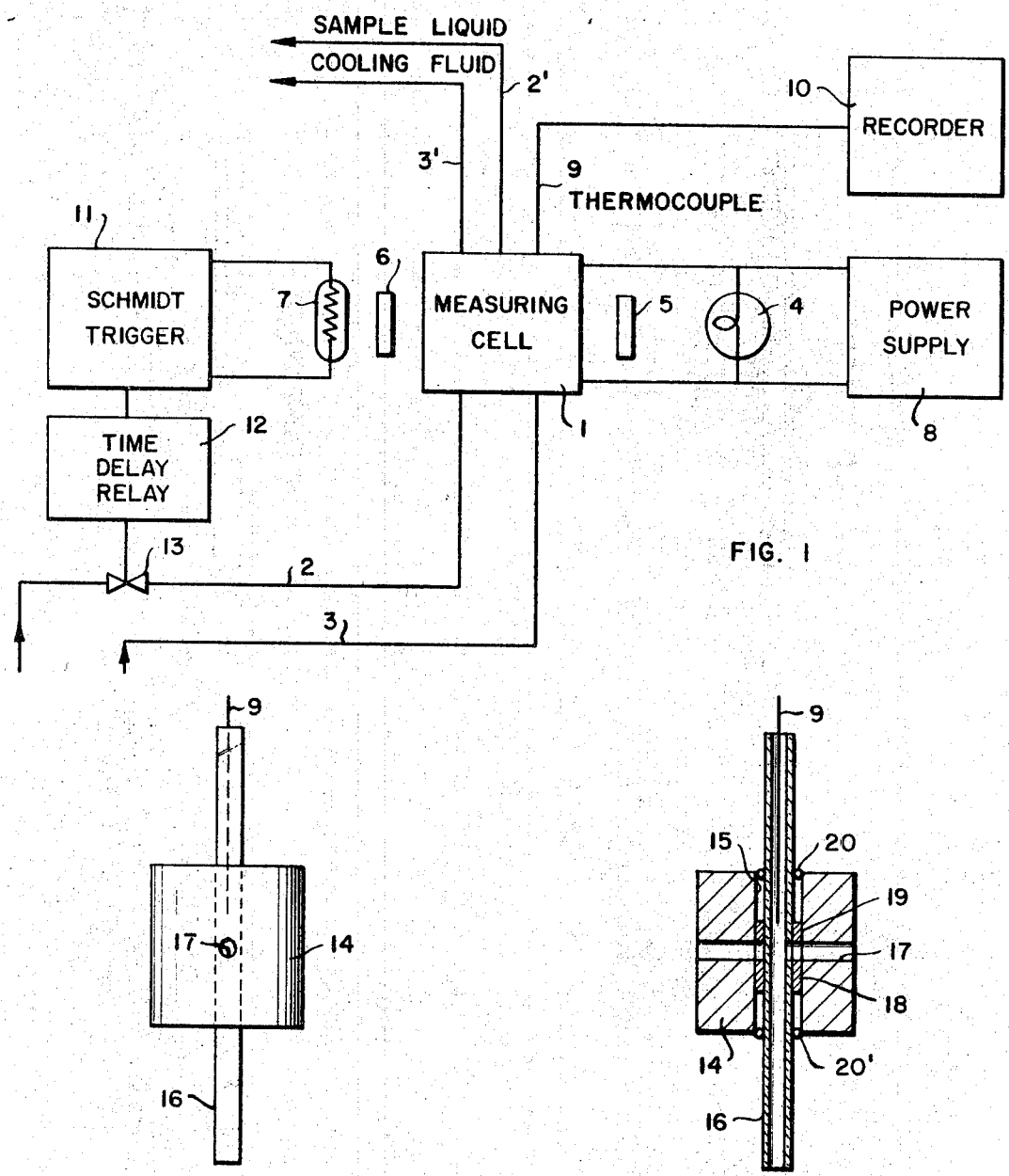
FIG. 1 is a schematic diagram of an apparatus for continuous measuring according to the invention.
FIGS. 2 and 3 are a side elevation and a vertical cross section respectively of the improved measuring cell according to the invention.

The apparatus diagrammatically shown in FIG. 1 comprises a measuring cell designated in a general sense by the numeral 1 and represented in greater detail in FIGS. 2 and 3. The liquid to be examined is introduced through a transparent conduit 2 and is withdrawn through a conduit 2', while the cooling liquid is introduced through 3 and withdrawn through 3'.

As in the main patent, the measuring cell is connected to an optical system comprising a lamp 4, a first polarizing filter 5, a second polarizing filter 6 crossed with respect to the first and a photo-electric detector 7, for example a cadmium sulfide photo-electric cell. The lamp 4 and the polarizing filter 5 are positioned on one side of the cell whereas the polarizing filter 6 and the detector 7 are arranged on the other side. The electricity supply for the lamp 4 and for the cooling of the cell 1 is provided by a suitable source 8. On the other hand, the temperature of the liquid within the cell is indicated by a thermocouple 9, for example a Chromel-Alumel thermocouple, connected to recorder 10. Finally, the detector 7 is connected to a trigger 11, for example a Schmitt trigger, which via a time delay relay 12 controls a valve 13 disposed in the supply conduit 2 for controlling the flow of liquid therein.

The measuring cell represented in greater detail by FIGS. 2 and 3 comprises a cooling block 14 of heat-conductive material, preferably an aluminum alloy such as Duralumin. This block is brought to a predetermined temperature, for example −25° C., by means of suitable elements, preferably thermo-elements (not shown) functioning according to the Peltier effect, or liquid cooling as shown generally in FIG. 1.

The block 14, which is advantageously cubical, is on the one hand pierced by a central bore 15 which receives a glass tube 16 designed to contain the liquid to be examined and on the other hand by a second bore 17 normal to the first for passing light from the lamp 4 through the polarizing filter 5 in the direction of the second polarizing filter 6 and the detector 7.

In one embodiment of the invention the heat exchange surface between the cooling block 14 and the tube 16 is smaller than the maximum possible contact surface between these two elements in the bore 15. As shown in FIG. 3, the contact is effected by two collars 18 and 19 of heat conductive material, preferably Duralumin, of unequal width. In addition, the extremities of the bore 15 are closed by ring gaskets 20 and 20'.

In a more special and preferred embodiment, excellent results were obtained with an alloyed aluminum block (Duralumin) of cubical form having a side of 30 mm. and pierced by a bore 15 with a diameter of 8 mm. and by a bore 17 with a diameter of 3.5 mm. The exchange surfaces were arranged in the form of a first 6.25 mm. wide collar 18 of Duralumin and a second 3.75 mm. wide collar 19 of Duralumin, the two collars being situated immediately below and above the transverse bore 17. The glass tube 16 has an outside diameter of 6.2 millimeters and the collars have a bore of slightly over 6.2 millimeters so that the tube may be inserted therein. While the total surface of the bore 15 is 520 mm.², the exchange surface formed by the two collars 18 and 19 is only 200 mm.².

By way of comparison and in order to show the effect of the choice of exchange surface, the cloud point values given by the apparatus on the one hand and the values according to ASTM method D97/57 on the other are summarized below for four different exchange surfaces arranged in the same block.

| Block No. | Exchange surface, mm.² | Apparatus indication, °C. | ASTM method D 97/57, °C. |
|---|---|---|---|
| 1 | 520 | −16<br>+3<br>+12 | −11<br>−3<br>+7 |
| 2 | 0 | −13.5<br>−10<br>−3 | −12<br>−3<br>+3 |
| 3 | 260 | −11<br>+3<br>+10<br>+12 | −10<br>+3<br>+6<br>+9 |
| 4 | 200 | −10<br>+3<br>+10.5<br>+12.5<br>−17 | −10<br>+3<br>+10<br>+12<br>−16.5 |

It can be seen that Block No. 4 which represents the preferred embodiment of the invention yields the best results in the example in question in which the block is brought to a temperature of −25° C., viz for determining the cloud point of a gas oil between +15 and −20° C.

Clearly, if the dimensions of tube 16 were changed resulting in a change in the volume of sample liquid, then the heat exchange surface area would also have to be changed proportionally.

The apparatus shown in FIG. 1 permits the determination of the cloud point by means of a continuous method in which the duration of the measurement cycle may vary from, for example, 1 to 3 minutes according to the cloud point of the sample. When anisotropic crystals corresponding to the cloud point appear, the detector 7 receives light and transmits a signal to the trigger 11 which operates the electro-magnetic valve 13. This valve which is kept open for, for example, 15 seconds by the time-delay relay 12, purges the cell 1 and lets in a fresh sample. The thermocouple 9 arranged in the cell transmits the temperature of the analyzed product to the recorder 10. The temperature is recorded in the form of a peak, the top of which corresponds to the temperature of the cloud point.

We claim as our invention:

1. An apparatus using a source of polarized light and a cross polarized filter for determining the cloud point of a liquid wherein the cloud point is detected by the liquid of crystals having an anisotropic structure, said apparatus comprising:
   a transparent flow conduit having an outside diameter of substantially 6.2 millimeters;
   a block of heat conductive material substantially 30 millimeters on a side, having a first bore of substantially 8 millimeters therethrough and a second bore therethrough normal to said first bore and intersecting therewith, said second bore being optically aligned with said source of polarized light and cross-polarized filter, one on either side of said block;
   cooling means associated with said block to maintain it at a predetermined temperature below the cloud-point of the liquid, and
   a pair of collars formed in said first bore, one of said collars being positioned above said intersection and one below with the upper collar being substantially 6.25 millimters high and the lower collar being substantially 3.75 millimeters high, said collars having an internal diameter substantially equal to the outside diameter of said transparent conduit, said transparent conduit being positioned in said first bore in heat transfer relationship with said collars whereby the cloud point of a liquid in said transparent conduit may be determined by an increase in light received through said second bore due to the appearance of anisotropic crystals in said liquid.

2. An apparatus using crossed polarized filters for determining the cloud point for a liquid wherein the cloud point is detected by the appearance in the liquid of crystals having an anisotropic structure, said apparatus comprising:
- a transparent flow conduit;
- a block of heat conductive material having a first bore therethrough and a second bore therethrough normal to said first bore and intersecting therewith, said second bore being optically aligned with a source of polarized light and cross-polarized filters; one on either side of said block;
- cooling means associated with said block to maintain it at a predetermined temperature below the cloud-point of the liquid, and
- a pair of collars formed in said first bore, one of said collars being positioned above said intersection and the other below, said collars having an internal diameter substantial equal to the outside diameter of said conduit, said conduit being positioned in said first bore in heat transfer relationship with said collars whereby the cloud point of a liquid in said transparent conduit may be determined by an increase in light received through said second bore due to the appearence of anisotropic crystals in said liquid.

References Cited

UNITED STATES PATENTS

| | | | |
|---|---|---|---|
| 3,031,880 | 5/1962 | Findlay | 73—17 |
| 3,161,039 | 12/1964 | Kapff | 73—17 |
| 3,174,824 | 3/1965 | Lupfer | 73—17 |
| 3,187,557 | 6/1965 | Holbourne | 73—17 |
| 3,447,358 | 6/1969 | Crespin et al. | 73—17 |

JAMES J. GILL, Primary Examiner

HERBERT GOLDSTEIN, Assistant Examiner